(12) United States Patent
Kubota et al.

(10) Patent No.: US 9,011,989 B2
(45) Date of Patent: Apr. 21, 2015

(54) LIQUID CRYSTAL COMPOSITION, COMPOSITE OF POLYMER AND LIQUID CRYSTAL, AND LIQUID CRYSTAL DISPLAY DEVICE

(71) Applicant: Semiconductor Energy Laboratory Co., Ltd., Atsugi-shi, Kanagawa-ken (JP)

(72) Inventors: Daisuke Kubota, Kanagawa (JP); Takahiro Yamamoto, Tokyo (JP); Makoto Ikenaga, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 146 days.

(21) Appl. No.: 13/658,129

(22) Filed: Oct. 23, 2012

(65) Prior Publication Data

US 2013/0107188 A1    May 2, 2013

(30) Foreign Application Priority Data

Nov. 1, 2011  (JP) ................... 2011-240546
Nov. 30, 2011 (JP) ................... 2011-262669

(51) Int. Cl.
| | |
|---|---|
| *C09K 19/36* | (2006.01) |
| *C09K 19/54* | (2006.01) |
| *G02F 1/1343* | (2006.01) |
| *C09K 19/02* | (2006.01) |
| *C09K 19/04* | (2006.01) |
| *C09K 19/12* | (2006.01) |

(Continued)

(52) U.S. Cl.
CPC ..... *C09K 19/0275* (2013.01); *C09K 2019/0448* (2013.01); *C09K 2019/122* (2013.01); *C09K 2019/123* (2013.01); *C09K 2019/2035* (2013.01); *C09K 2019/2078* (2013.01); *C09K 2019/3016* (2013.01); *C09K 2019/3408* (2013.01)

(58) Field of Classification Search
CPC ............ C09K 19/0275; C09K 19/0448; G02F 1/1343
USPC ............. 252/299.01, 299.5; 428/1.1; 349/183
See application file for complete search history.

(56) References Cited

U.S. PATENT DOCUMENTS

| | | |
|---|---|---|
| 7,576,829 B2 | 8/2009 | Kikuchi et al. |
| 7,648,647 B2 | 1/2010 | Kikuchi et al. |

(Continued)

FOREIGN PATENT DOCUMENTS

| | | |
|---|---|---|
| JP | 2003-327966 | 11/2003 |
| WO | WO-2005/090520 A1 | 9/2005 |

*Primary Examiner* — Shean C Wu
(74) *Attorney, Agent, or Firm* — Nixon Peabody LLP; Jeffrey L. Costellia

(57) ABSTRACT

Defective display by a liquid crystal display device is reduced. In a liquid crystal composition which contains a liquid crystal material exhibiting a blue phase and has a transmission spectrum with a single peak in a temperature range where the liquid crystal material exhibits a blue phase, it is found that the blue phase of the liquid crystal material can be stabilized in a wide temperature range by polymer stabilization treatment. Thus, the liquid crystal composition allows the polymer stabilization treatment to be achieved in a wider temperature range. This makes it possible to reduce defective orientation in a composite of polymer and liquid crystal formed by subjecting the liquid crystal composition to the treatment. As a result, it is possible to reduce defective display by a liquid crystal display device which includes the composite of polymer and liquid crystal.

13 Claims, 13 Drawing Sheets

(51) Int. Cl.
*C09K 19/20* (2006.01)
*C09K 19/30* (2006.01)
*C09K 19/34* (2006.01)

(56) References Cited

U.S. PATENT DOCUMENTS

| | | | |
|---|---|---|---|
| 7,722,783 B2 | 5/2010 | Haseba et al. |
| 7,794,621 B2 | 9/2010 | Schott et al. |
| 2008/0259254 A1 | 10/2008 | Kikuchi et al. |
| 2008/0280071 A1 | 11/2008 | Kikuchi et al. |
| 2009/0135368 A1 | 5/2009 | Haseba et al. |
| 2009/0220754 A1 | 9/2009 | Yatake |
| 2009/0267025 A1 | 10/2009 | Schott et al. |
| 2010/0103366 A1 | 4/2010 | Farrand et al. |
| 2010/0258763 A1 | 10/2010 | Schott et al. |
| 2011/0170040 A1 | 7/2011 | Park et al. |
| 2012/0012785 A1 | 1/2012 | Schott et al. |
| 2012/0138853 A1 | 6/2012 | Kubota et al. |

LIQUID CRYSTAL COMPOSITION, COMPOSITE OF POLYMER AND LIQUID CRYSTAL, AND LIQUID CRYSTAL DISPLAY DEVICE

BACKGROUND OF THE INVENTION

1. Field of the Invention

The present invention relates to a liquid crystal composition. The present invention particularly relates to a liquid crystal composition which contains a liquid crystal material exhibiting a blue phase. The present invention also relates to a composite of a polymer and a liquid crystal which is formed using the liquid crystal composition as a precursor. The present invention further relates to a liquid crystal display device which includes the composite of the polymer and the liquid crystal.

2. Description of the Related Art

As a display device which is thin and lightweight (a so-called flat panel display), a liquid crystal display device including a liquid crystal element, a light-emitting device including a self-light-emitting element, a field emission display (FED), and the like have been competitively developed.

In a liquid crystal display device, response speed of liquid crystal molecules is required to be increased. Among various kinds of display modes of liquid crystal, liquid crystal modes capable of high-speed response are a ferroelectric liquid crystal (FLC) mode, an optically compensated bend (OCB) mode, and a mode using liquid crystal exhibiting a blue phase.

Blue phases are liquid crystal phases which are exhibited between a chiral nematic phase having a relatively short spiral pitch and an isotropic phase, and have a feature of an extremely high response speed. A liquid crystal display device which includes a liquid crystal exhibiting a blue phase does not require an alignment film and has a wide viewing angle. However, the blue phases are exhibited only in a small temperature range of 1° C. to 3° C. between a cholesteric phase and an isotropic phase. Thus, there is a problem in that the temperature of the element needs to be controlled precisely.

In order to solve this problem, it is proposed that the temperature range where a liquid crystal material contained in a liquid crystal composition exhibits a blue phase be widened by subjecting the liquid crystal composition to polymer stabilization treatment (see Reference 1, for example). Specifically, Reference 1 discloses a technique to stabilize a blue phase of a liquid crystal material (or to expand the temperature range where a blue phase is exhibited) with a polymer (a polymer network) formed by photopolymerization or thermal polymerization of monomers contained in the liquid crystal composition.

REFERENCE

[Reference 1] PCT International Publication No. 2005/090520

SUMMARY OF THE INVENTION

In the case where a blue phase of a liquid crystal material is stabilized with a polymer (a polymer network) formed by photopolymerization in the above-described polymer stabilization treatment, the treatment needs to be performed in a state where the temperature of a liquid crystal composition is kept within a particular range. The treatment typically needs to be performed in a temperature range where the liquid crystal material contained in the liquid crystal composition exhibits a blue phase.

However, as mentioned above, a liquid crystal material which has not been subjected to polymer stabilization treatment exhibits a blue phase only in a narrow temperature range. Therefore, it is not easy to keep the temperature of a liquid crystal composition in a temperature range where a liquid crystal material contained in the liquid crystal composition exhibits a blue phase. If a liquid crystal composition out of the temperature range is subjected to the treatment, a liquid crystal material contained in the liquid crystal composition does not exhibit a blue phase in some cases (the liquid crystal material may exhibit a phase other than a blue phase, which is hereinafter also referred to as defective orientation). This leads directly to defective display by a liquid crystal display device which includes a composite of a polymer and a liquid crystal formed by the treatment. This problem is likely to be serious particularly when the liquid crystal display device has a large size. This is because, in such a case, it is difficult to hold the whole liquid crystal composition evenly in a particular temperature range at the time of the polymer stabilization treatment.

In view of the above-described problem, it is an object of one embodiment of the present invention to provide a liquid crystal composition which contains a liquid crystal material whose blue phase can be stabilized in a wide temperature range by polymer stabilization treatment. It is another object to reduce the occurrence of defective display by a liquid crystal display device.

The present inventors have found out that a liquid crystal composition which contains a liquid crystal material exhibiting a blue phase and has a transmission spectrum with a single peak in a temperature range where the liquid crystal material exhibits a blue phase allows polymer stabilization treatment to be achieved in a wide temperature range.

The present inventors have also found out that the occurrence of defective orientation is reduced in a composite of a polymer and a liquid crystal which has textures (e.g., confocal laser microscope images) with different aspects in a surface region and in an inner region.

The liquid crystal composition of one embodiment of the present invention has a transmission spectrum with a single peak in a temperature range where the liquid crystal material contained in the liquid crystal composition exhibits a blue phase. Such a liquid crystal composition allows polymer stabilization treatment to be achieved in a wider temperature range. This makes it possible to reduce defective orientation in a composite of a polymer and a liquid crystal which is formed by subjecting the liquid crystal composition to the treatment. Thus, it is possible to reduce defective display by a liquid crystal display device which includes the composite of the polymer and the liquid crystal.

In the composite of the polymer and the liquid crystal of one embodiment of the present invention, an aspect of a texture (e.g., a confocal laser microscope image) in a surface region is different from an aspect of a texture in an inner region. In such a composite of a polymer and a liquid crystal, the occurrence of defective orientation is reduced. Accordingly, it is possible to reduce defective display by a liquid crystal display device which includes the composite of the polymer and the liquid crystal.

DETAILED DESCRIPTION OF THE INVENTION

Figure 1:
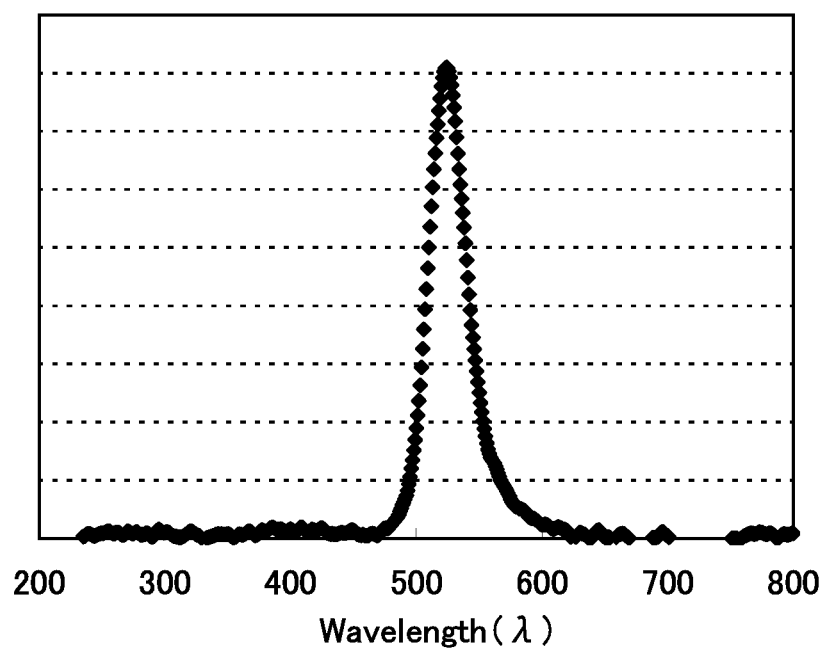
FIG. 1 shows a transmission spectrum.

Embodiments of the present invention will be described in detail below. Note that the present invention is not limited to the following description, and various changes and modifications can be made without departing from the spirit and scope of the present invention. Therefore, the present invention should not be construed as being limited to the following description.

<Liquid Crystal Composition>

A liquid crystal composition of one embodiment of the present invention will be described below. Note that the liquid crystal composition has a transmission spectrum with a single peak in a temperature range where a liquid crystal material contained in the liquid crystal composition exhibits a blue phase.

As the liquid crystal composition, a liquid crystal composition which includes a liquid crystal material exhibiting a blue phase, a liquid-crystalline monomer, a non-liquid-crystalline monomer, and a polymerization initiator can be used.

Blue phases are phases in which light is not substantially scattered and which are optically isotropic. As the liquid crystal material exhibiting a blue phase, there are a nematic liquid-crystalline compound, a smectic liquid-crystalline compound, and the like, and the nematic liquid-crystalline compound is preferred. Note that the nematic liquid-crystalline compound is not particularly limited, and examples thereof are a biphenyl-based compound, a terphenyl-based compound, a phenylcyclohexyl-based compound, a biphenylcyclohexyl-based compound, a phenylbicyclohexyl-based compound, a benzoic acid phenyl-based compound, a cyclohexyl benzoic acid phenyl-based compound, a phenyl benzoic acid phenyl-based compound, a bicyclohexyl carboxylic acid phenyl-based compound, an azomethine-based compound, azo- and azoxy-based compounds, a stilbene-based compound, a bicyclohexyl-based compound, a phenylpyrimidine-based compound, a biphenylpyrimidine-based compound, a pyrimidine-based compound, a biphenyl ethyne-based compound, and the like.

The liquid-crystalline monomer is a monomer that has a liquid crystallinity and can be polymerized through photopolymerization. For example, as the liquid-crystalline monomer, a monomer having a mesogenic skeleton and two alkyl chains can be used. Note that the mesogenic skeleton in this specification refers to a highly rigid unit having two or more rings such as aromatic rings. The two alkyl chains may be the same or different.

The non-liquid-crystalline monomer refers to a monomer that does not have a liquid crystallinity, can be polymerized through photopolymerization, and does not have a rod-shaped molecular structure (for example, a molecular structure with an alkyl group, a cyano group, a fluorine, or the like present at an end of a biphenyl group, a biphenyl-cyclohexyl group, or the like). Specifically, there are monomers containing polymerizable groups such as acryloyl groups, methacryloyl groups, vinyl groups, epoxy groups, fumarate groups, cinnamoyl groups, and the like in molecular structures; however, the non-liquid-crystalline monomer is not limited to these examples.

The photopolymerization reaction disclosed in this specification may be caused using any kind of light; it is preferable to use ultraviolet light. Therefore, as the polymerization initiator, an acetophenone, a benzophenone, a benzoin, a benzil, a Michler's ketone, a benzoin alkyl ether, a benzil dimethylketal, or a thioxanthone can be used as appropriate, for example. Note that after the polymer stabilization treatment, the polymerization initiator becomes an impurity that does not contribute to operation of a liquid crystal display device in the composite of the polymer and the liquid crystal; therefore, the amount of the polymerization initiator is preferably as small as possible. For example, the amount of the polymerization initiator is preferably less than or equal to 0.5 wt % in the liquid crystal composition.

The liquid crystal composition may include a chiral material, in addition to the liquid crystal material exhibiting a blue phase, the liquid-crystalline monomer, the non-liquid-crystalline monomer, and the polymerization initiator. Note that the chiral material is a material with which a twist structure is caused in a liquid crystal material. The amount of the chiral material added affects the diffraction wavelength of the liquid crystal material exhibiting a blue phase. Therefore, the amount of the chiral material to be added is preferably adjusted so that the diffraction wavelength of the liquid crystal material exhibiting a blue phase is out of a visible region (380 nm to 750 nm). As the chiral material, S-811 (produced by Merck), S-1011 (produced by Merck), 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.), or the like can be selected as appropriate.

In addition, the liquid crystal composition according to one embodiment of the present invention has a transmission spectrum with a single peak in a temperature range where the liquid crystal material contained in the liquid crystal composition exhibits a blue phase. This means that blue phases of the liquid crystal composition exhibiting a blue phase have uniform or substantially uniform orientation.

<Polymer Stabilization Treatment>

By subjecting the above-described liquid crystal composition to polymer stabilization treatment (polymerization treatment), a composite of a polymer and a liquid crystal containing the liquid crystal material whose blue phase is stabilized with a polymer can be obtained. Note that the polymer stabilization treatment is a treatment for stabilizing the blue phase of the liquid crystal material with a polymer (a polymer network) which is formed by polymerization of the liquid-crystalline monomer and the non-liquid-crystalline monomer contained in the liquid crystal composition.

For example, as the polymer stabilization treatment, a treatment in which the liquid crystal composition is irradiated with ultraviolet light in a temperature range where the liquid crystal material exhibiting a blue phase exhibits a blue phase or an isotropic phase can be employed. Note that the liquid crystal composition according to one embodiment of the present invention allows the polymer stabilization treatment to be achieved not only in a temperature range where the liquid crystal material exhibiting a blue phase exhibits a blue phase but also in a temperature range where it exhibits an isotropic phase.

This makes it possible to obtain a composite of a polymer and a liquid crystal which includes a polymer (a polymer network) obtained by photopolymerization of the liquid-crystalline monomer and the non-liquid-crystalline monomer contained in the liquid crystal composition, and a liquid crystal material whose blue phase is stabilized with the polymer (the polymer network). Note that the composite of the polymer and the liquid crystal which is obtained using the liquid crystal composition according to one embodiment of the present invention as a precursor has a transmission spectrum with a single peak in a temperature range where the liquid crystal material contained therein exhibits a blue phase. This means blue phases in the composite of the polymer and the liquid crystal have uniform or substantially uniform orientation.

Note that in the case of obtaining a composite of a polymer and a liquid crystal by the above method, it is preferable to select a liquid-crystalline monomer and a non-liquid-crystalline monomer of a liquid crystal composition, while giving due consideration to the following.

Monomers such as the liquid-crystalline monomer and the non-liquid-crystalline monomer contained in the liquid crystal composition are likely to affect the temperature of phase transition between blue and isotropic phases in the liquid crystal material exhibiting a blue phase which is contained in the liquid crystal composition. Specifically, as the proportion of the monomer contained in the liquid crystal composition increases, the phase transition temperature is lowered (or raised). On the other hand, polymers such as the polymer network obtained by polymerization of monomers are unlikely to affect the phase transition temperature. Therefore, as the proportion of the monomers decreases (or the proportion of the polymer increases) through the polymer stabilization treatment (polymerization treatment), the phase transition temperature is also raised (or lowered) linearly. In this regard, in the case of employing the above method to obtain a composite of a polymer and a liquid crystal, it is preferable to select monomers capable of lowering the phase transition temperature of the liquid crystal material exhibiting a blue phase, as the liquid-crystalline monomer and the non-liquid-crystalline monomer contained in the liquid crystal composition. This can easily cause the phase transition from an isotropic phase to a blue phase in the liquid crystal material in the case of employing the above method.

<Composite of Polymer and Liquid Crystal>

By the above-described polymer stabilization treatment, a composite of a polymer and a liquid crystal according to one embodiment of the present invention can be obtained. An observation of reflected laser light with a confocal laser microscope confirms that the composite of the polymer and the liquid crystal has textures with different aspects in a surface region and in an inner region.

Specifically, in the texture in the surface region, at least one first interface between a blue phase and a blue phase defined by a line which forms a loop and at least one second interface between a blue phase and a blue phase defined by a line which has a starting point and an ending point are observed. Note that in the texture in the surface region, there are cases where the first interface is not observed and only the second interface is observed. On the other hand, in the texture in the inner region, the first interface and the second interface are not observed.

Note that an optical system of a confocal laser microscope is characterized by the capability of eliminating information of the non-focal plane and extracting only information of the focal plane. In addition, it enables an observation in the thickness direction as well as in the planar direction. This means that the use of the optical system makes it possible to observe an interface between a blue phase and a blue phase having different azimuth angles or polar angles, or both, in a texture.

Example 1

In this example, examples of a liquid crystal composition according to one embodiment of the present invention and a composite of a polymer and a liquid crystal which is formed using the liquid crystal composition will be described.

(Liquid Crystal Composition)

A liquid crystal composition used in this example includes E-8 (abbreviation) (produced by LCC Corporation), 4-(trans-4-n-propylcyclohexyl)-3',4'-difluoro-1,1'-biphenyl (abbreviation: CPP-3FF), and 4-n-pentylbenzoic acid 4-cyano-3-fluorophenyl ester (abbreviation: PEP-5CNF) as a liquid crystal material exhibiting a blue phase, 1,4-bis[4-(6-acryloyloxy-n-hexyl-1-oxy)benzoyloxy]-2-methylbenzene (abbreviation: RM257-O6, produced by SYNTHON Chemicals GmbH & Co. KG) as a liquid-crystalline monomer, dodecyl methacrylate (abbreviation: DMeAc) (produced by Tokyo Chemical Industry Co., Ltd.) as a non-liquid-crystalline monomer, DMPAP (abbreviation) (produced by Tokyo Chemical Industry Co., Ltd) as a polymerization initiator, and 1,4:3,6-dianhydro-2,5-bis[4-(n-hexyl-1-oxy)benzoic acid] sorbitol (abbreviation: ISO-(6OBA)$_2$) (produced by Midori Kagaku Co., Ltd.) as a chiral material.

The structural formulae of the above-described substances are shown below.

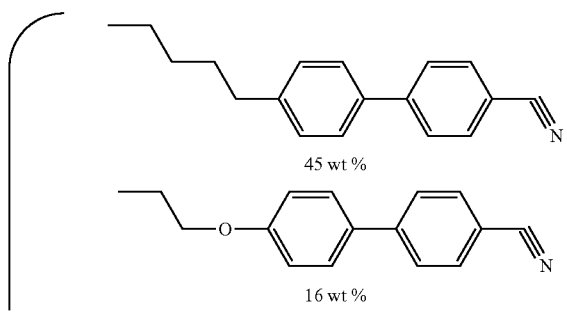

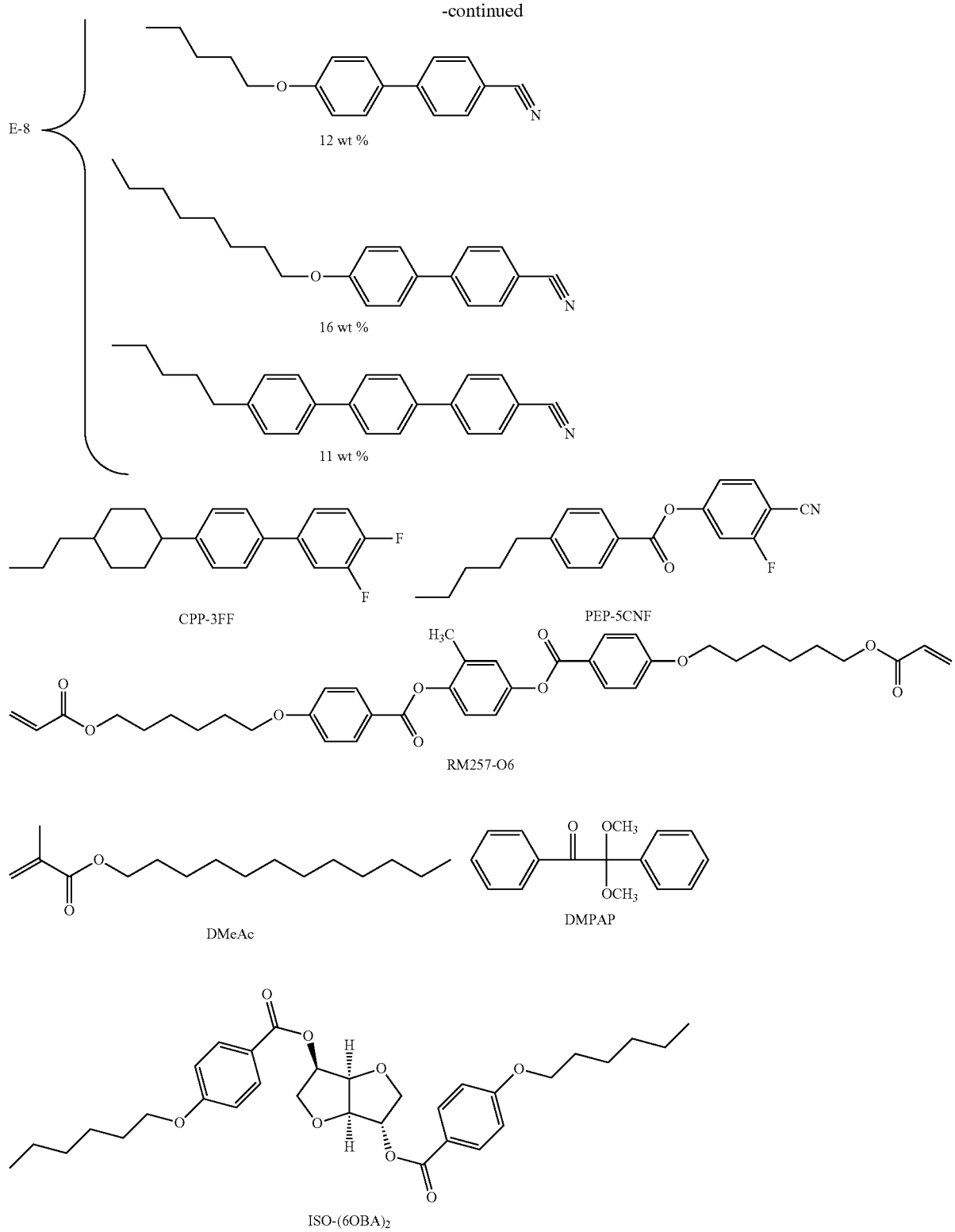

Note that E-8 in the liquid crystal material is a mixture of five kinds of substances (4-cyano-4'-pentylbiphenyl, 4-cyano-4'-propyloxybiphenyl, 4-cyano-4'-pentyloxybiphenyl, 4-cyano-4'-octyloxybiphenyl, and 4-cyano-4''-pentyl-p-terphenyl) in proportions (wt %) written besides the above structural formulae. The liquid-crystalline monomer RM257-O6 is a liquid-crystalline monomer with an oxyalkylene group having a chain length n (including carbon and oxygen) of 7.

The proportions of the above-described substances in the liquid crystal composition used in this example are shown below.

TABLE 1

| Classification | Name of material | Mix proportion (wt %) |
|---|---|---|
| Liquid crystal material | E-8 | 34.0 |
| | CPP-3FF | 25.5 |
| | PEP-5CNF | 25.5 |
| Liquid-crystalline monomer | RM257-O6 | 4.0 |
| Non-liquid-crystallline monomer | DMeAc | 4.0 |
| Polymerization initiator | DMPAP | small amount |
| Chiral material | ISO-(6OBA)$_2$ | 6.9 |
| Total | | 100.0 |

The liquid crystal material contained in the liquid crystal composition used in this example exhibited a blue phase at 30.5° C. to 36.4° C. In other words, the point of phase transition between a cholesteric phase and a blue phase in the liquid crystal material contained in the liquid crystal composition was 30.5° C., and the point of phase transition between an isotropic phase and a blue phase therein was 36.4° C.

FIG. 1 shows a transmission spectrum at a temperature of 34° C. where the liquid crystal material contained in the liquid crystal composition exhibits a blue phase. Note that the transmission spectrum in FIG. 1 is obtained by removing as a background a transmission spectrum obtained at a temperature where the liquid crystal material contained in the liquid crystal composition exhibits an isotropic phase. In other words, the transmission spectrum in FIG. 1 is obtained by subtracting the background transmission spectrum from a transmission spectrum obtained in a state where a liquid crystal cell is heated to 34° C. FIG. 1 shows that the liquid crystal composition used in this example has a transmission spectrum with a single peak at a temperature where the liquid crystal material contained in the liquid crystal composition exhibits a blue phase.

(Polymer Stabilization Treatment)

In this example, a liquid crystal cell was fabricated by using a sealant to enclose a liquid crystal composition provided between a pair of glass substrates. Then, the liquid crystal cell was subjected to polymer stabilization treatment. Note that the liquid crystal cell was fabricated by attaching the pair of glass substrates with the sealant with a gap (4 μm) therebetween and then injecting the liquid crystal composition into a space between the substrates by an injection method. As the sealant, an ultraviolet and heat curable sealant was used. Furthermore, the sealant was subjected to ultraviolet light (irradiance: 100 mW/cm$^2$) irradiation treatment for 90 seconds as curing treatment. Then, the liquid crystal cell was subjected to heat treatment at 120° C. for 1 hour.

The polymer stabilization treatment was performed by raising the temperature to 70° C. where the liquid crystal material contained in the liquid crystal composition exhibits an isotropic phase and then lowering the temperature to 40° C., and by irradiating the liquid crystal cell held in that state with ultraviolet light (wavelength: 365 nm, irradiance: 8 mW/cm$^2$) for 6 minutes. Note that in the liquid crystal composition used in this example, the liquid crystal material contained therein exhibits an isotropic phase at 40° C.

(Composite of Polymer and Liquid Crystal)

Figure 2:
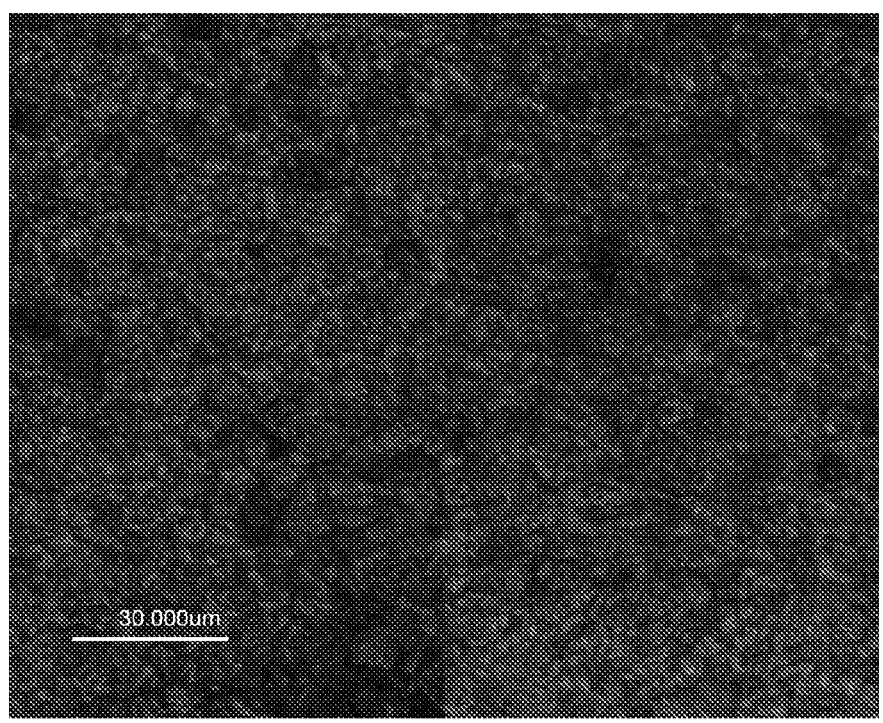
FIG. 2 shows a texture of a composite of a polymer and a liquid crystal observed with an optical microscope.

By the above-described polymer stabilization treatment, a composite of a polymer and a liquid crystal was obtained. FIG. 2 shows a texture of the composite of the polymer and the liquid crystal observed with a polarizing microscope (MX-50 produced by Olympus Corporation). Note that the observation was performed with the polarizing microscope under the following conditions: the measurement mode was a reflective mode; polarizers were disposed in crossed nicols; the magnification was 500 times; and the temperature was room temperature.

In the composite of the polymer and the liquid crystal shown in FIG. 2, the whole liquid crystal material exhibited a blue phase even in a room temperature environment. In other words, the composite of the polymer and the liquid crystal obtained by the polymer stabilization treatment of the liquid crystal composition used in this example had no defective orientation in a room temperature environment.

Figure 3:
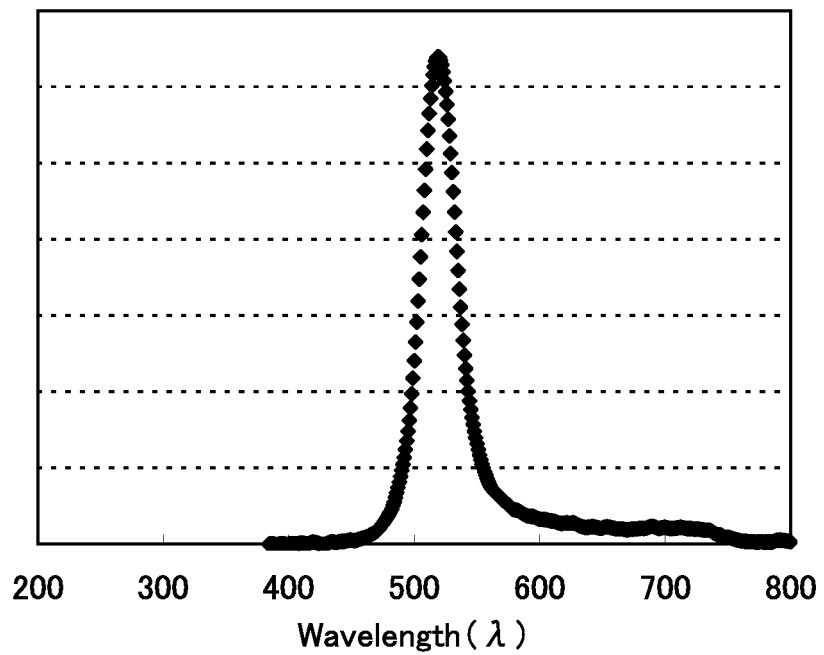
FIG. 3 shows a transmission spectrum.

FIG. 3 shows a transmission spectrum of the composite of the polymer and the liquid crystal in a room temperature environment. FIG. 3 shows that the composite of the polymer and the liquid crystal has a transmission spectrum with a single peak in a room temperature environment.

Comparative Example 1

In this comparative example, examples of a liquid crystal composition having a transmission spectrum with two or more peaks in a temperature range where a liquid crystal material exhibits a blue phase and a composite of a polymer and a liquid crystal which is formed using the liquid crystal composition will be described.

(Liquid Crystal Composition)

A liquid crystal composition used in this comparative example includes E-8, CPP-3FF, and PEP-5CNF as a liquid crystal material exhibiting a blue phase, 1,4-bis[4-(3-acryloyloxy-n-propyl-1-oxy)benzoyloxy]-2-methylbenzene (abbreviation: RM257-O3, produced by SYNTHON Chemicals GmbH & Co. KG) as a liquid-crystalline monomer, DMeAc as a non-liquid-crystalline monomer, DMPAP as a polymerization initiator, and ISO-(6OBA)$_2$ as a chiral material. In short, the liquid crystal composition used in this comparative example includes the same substances as those of the liquid crystal composition used in the above example, except the liquid-crystalline monomer.

The structural formula of the liquid-crystalline monomer RM257-O3 is shown below.

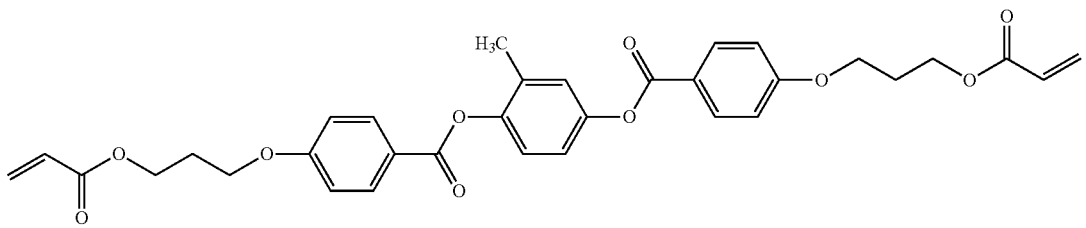

RM257-O3

Note that the liquid-crystalline monomer RM257-O3 is a liquid-crystalline monomer with an oxyalkylene group having a chain length n (including carbon and oxygen) of 4.

The proportions of the above-described substances in the liquid crystal composition used in this comparative example are shown below.

TABLE 2

| Classification | Name of material | Mix proportion (wt %) |
|---|---|---|
| Liquid crystal material | E-8 | 34.0 |
| | CPP-3FF | 25.5 |
| | PEP-5CNF | 25.5 |
| Non-liquid-crystallline monomer | DMeAc | 4.0 |
| Liquid-crystalline monomer | RM257-O3 | 4.0 |
| Polymerization initiator | DMPAP | small amount |
| Chiral material | ISO-(6OBA)$_2$ | 6.9 |
| Total | | 100.0 |

The liquid crystal material contained in the liquid crystal composition used in this comparative example exhibited a blue phase at 30.7° C. to 38.4° C. In other words, the point of phase transition between a cholesteric phase and a blue phase in the liquid crystal material contained in the liquid crystal composition was 30.7° C., and the point of phase transition between an isotropic phase and a blue phase therein was 38.4° C.

Figure 4:
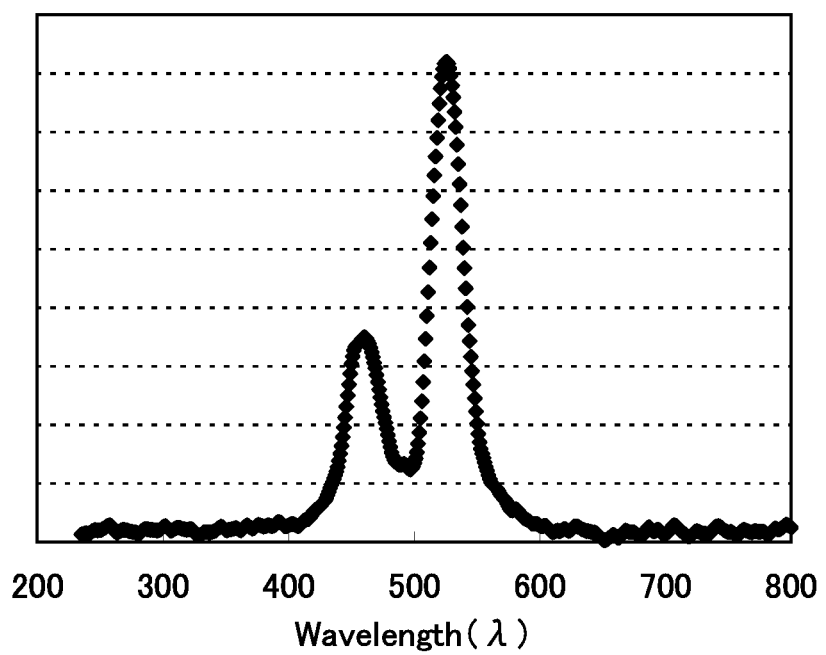
FIG. 4 shows a transmission spectrum.

FIG. 4 shows a transmission spectrum of the liquid crystal composition at 34° C. Note that the transmission spectrum in FIG. 4, as well as the transmission spectrum in FIG. 1, is obtained by removing as a background a transmission spectrum obtained at a temperature where the liquid crystal material contained in the liquid crystal composition exhibits an isotropic phase. FIG. 4 shows that the liquid crystal composition used in this comparative example has a transmission spectrum with two or more peaks at a temperature where the liquid crystal material contained in the liquid crystal composition exhibits a blue phase.

(Polymer Stabilization Treatment)

In this comparative example, polymer stabilization treatment was performed by the same method as in the above example, except that the liquid crystal cell was held at a temperature of 39° C. at the time of ultraviolet light irradiation. Note that in the liquid crystal composition used in this comparative example, the liquid crystal material contained therein exhibits an isotropic phase at 39° C.

(Composite of Polymer and Liquid Crystal)

Figure 5:
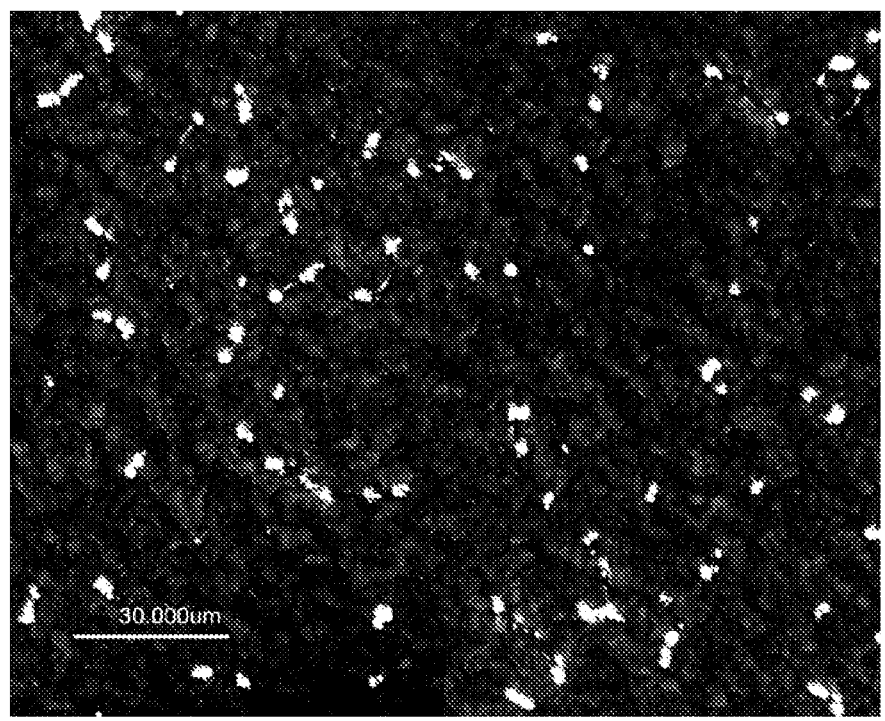
FIG. 5 shows a texture of a composite of a polymer and a liquid crystal observed with an optical microscope.

By the above-described polymer stabilization treatment, a composite of a polymer and a liquid crystal was obtained. FIG. 5 shows a texture of the composite of the polymer and the liquid crystal observed with a polarizing microscope (MX-50 produced by Olympus Corporation). Note that the observation was performed with the polarizing microscope under the following conditions: the measurement mode was a reflective mode; polarizers were disposed in crossed nicols; the magnification was 500 times; and the temperature was room temperature.

In the composite of the polymer and the liquid crystal shown in FIG. 5, the liquid crystal material exhibited a mixture of blue and cholesteric phases in a room temperature environment. In other words, the composite of the polymer and the liquid crystal obtained by the polymer stabilization treatment of the liquid crystal composition used in this comparative example had defective orientation in a room temperature environment.

Figure 6:
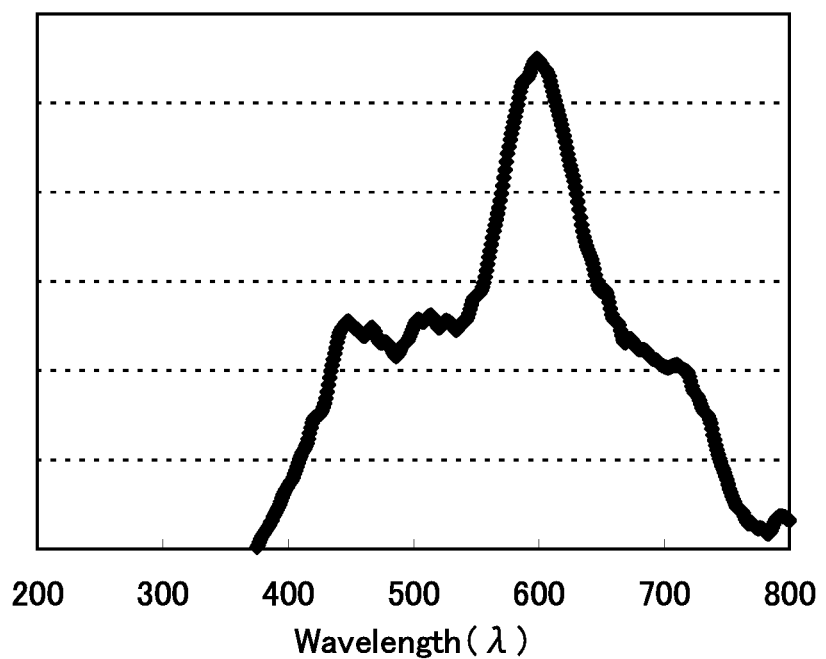
FIG. 6 shows a transmission spectrum.

FIG. 6 shows a transmission spectrum of the composite of the polymer and the liquid crystal in a room temperature environment. FIG. 6 shows that the composite of the polymer and the liquid crystal has a transmission spectrum with two or more peaks in a room temperature environment.

Example 2

In this example, an example of a composite of a polymer and a liquid crystal according to one embodiment of the present invention will be described. Note that in this example, a composite of a polymer and a liquid crystal was prepared using a liquid crystal composition having the same composition as the liquid crystal composition described in Example 1.

(Polymer Stabilization Treatment)

In this example, a liquid crystal cell was fabricated by using a sealant to enclose the liquid crystal composition provided between a pair of glass substrates. Then, the liquid crystal cell was subjected to polymer stabilization treatment. Note that the liquid crystal cell was fabricated by attaching the pair of glass substrates with the sealant with a gap (6 μm) therebetween and then injecting the liquid crystal composition into a space between the pair of glass substrates by an injection method. As the sealant, an ultraviolet and heat curable sealant was used. Furthermore, the sealant was subjected to ultraviolet light (irradiance: 100 mW/cm$^2$) irradiation treatment for 90 seconds as curing treatment. Next, the liquid crystal cell was subjected to heat treatment at 120° C. for 1 hour. Then, polishing treatment was performed such that the thickness of one of the pair of glass substrates on the side to be observed with a confocal laser microscope became 0.17 mm. Note that the thickness of each of the pair of glass substrates before the treatment was 0.7 mm.

The polymer stabilization treatment was performed by raising the temperature to 70° C. where the liquid crystal material contained in the liquid crystal composition exhibits an isotropic phase and then lowering the temperature to 36° C., and by irradiating the liquid crystal cell held in that state with ultraviolet light (wavelength: 365 nm, irradiance: 8 mW/cm$^2$) for 6 minutes.

(Composite of Polymer and Liquid Crystal)

Figure 7:
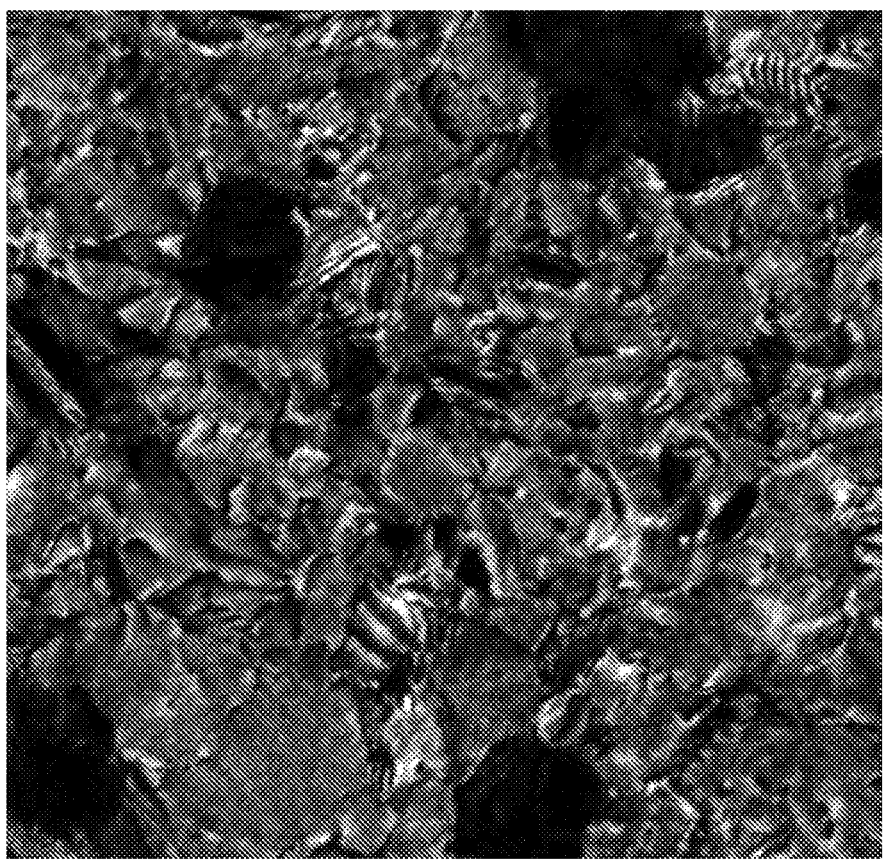
FIG. 7 shows a texture of a composite of a polymer and a liquid crystal.
Figure 8:
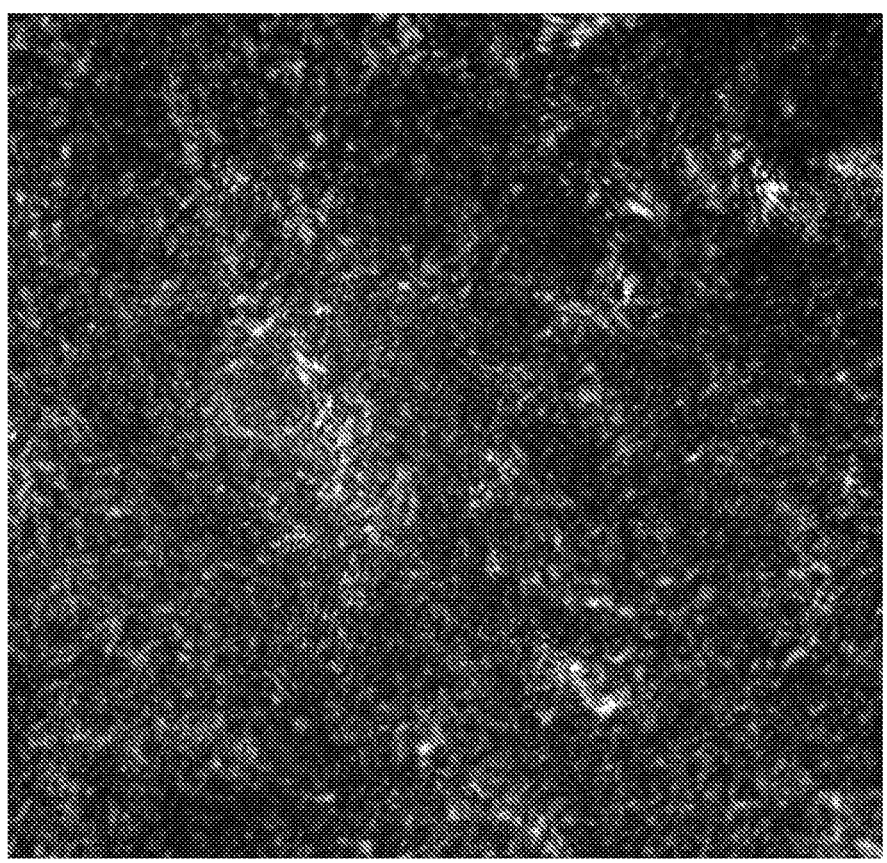
FIG. 8 shows a texture of a composite of a polymer and a liquid crystal.

By the above-described polymer stabilization treatment, a composite of a polymer and a liquid crystal was obtained. FIGS. 7 and 8 show textures of the composite of the polymer and the liquid crystal observed with a confocal laser microscope (A1 produced by Nikon Instech Co., Ltd.). Note that an optical system of a confocal laser microscope is characterized by the capability of eliminating information of the non-focal plane and extracting only information of the focal plane. In other words, when the focal plane is set as appropriate in the observation with the confocal laser microscope, a desired plane perpendicular to the thickness direction of an object can be observed. By utilization of this feature of the confocal laser microscope, observation images (textures) shown in FIGS. 7 and 8 were obtained. Specifically, FIG. 7 shows an observation image of the composite of the polymer and the liquid crystal in a region (a surface region) in the vicinity of the glass substrate on the observation side, and FIG. 8 shows an observation image of the composite of the polymer and the liquid crystal in a bulk region (an inner region). Note that the observations were performed using a laser with a wavelength of 488 nm under the following conditions: a measurement mode was a reflective mode; the magnification was 600 times; and the temperature was room temperature.

FIGS. 7 and 8 show that the composite of the polymer and the liquid crystal according to this example has textures with different aspects in the region (the surface region) in the vicinity of the glass substrate and in the bulk region (the inner region).

Specifically, it is confirmed from FIG. 7 that an interface between a blue phase and a blue phase exists in the region in the vicinity of the glass substrate in the composite of the polymer and the liquid crystal according to this example, but it is not or hardly confirmed that there is a single domain (a region which is separate from the other region because its interface forms a loop). In other words, it is confirmed from FIG. 7 that there is an interface between a blue phase and a blue phase (a second interface) defined by a line which has a starting point and an ending point, but it is not or hardly confirmed that there is an interface between a blue phase and a blue phase defined by a line which forms a loop.

In addition, it is not confirmed from FIG. 8 that an interface between a blue phase and a blue phase exits in the bulk region of the composite of the polymer and the liquid crystal according to this example.

Comparative Example 2

(Liquid Crystal Composition)

In this comparative example, a composite of a polymer and a liquid crystal was prepared using a liquid crystal composition having the same composition as the liquid crystal composition described in Comparative Example 1.

(Polymer Stabilization Treatment)

In this comparative example, a liquid crystal cell was fabricated by using a sealant to enclose the liquid crystal composition provided between a pair of glass substrates. Then, the liquid crystal cell was subjected to polymer stabilization treatment. Note that the liquid crystal cell was fabricated by attaching the pair of glass substrates with the sealant with a gap (6 μm) therebetween and then injecting the liquid crystal composition into a space between the pair of glass substrates by an injection method. As the sealant, an ultraviolet and heat curable sealant was used. Furthermore, the sealant was subjected to ultraviolet light (irradiance: 100 mW/cm$^2$) irradiation treatment for 90 seconds as curing treatment. Next, the liquid crystal cell was subjected to heat treatment at 120° C. for 1 hour. Then, polishing treatment was performed such that the thickness of one of the pair of glass substrates on the side to be observed with a confocal laser microscope became 0.17 mm. Note that the thickness of each of the pair of glass substrates before the treatment was 0.7 mm.

The polymer stabilization treatment was performed by raising the temperature to 70° C. where the liquid crystal material contained in the liquid crystal composition exhibits an isotropic phase and then lowering the temperature to 34° C., and by irradiating the liquid crystal cell held in that state with ultraviolet light (wavelength: 365 nm, irradiance: 8 mW/cm$^2$) for 6 minutes.

(Composite of Polymer and Liquid Crystal)

Figure 9:
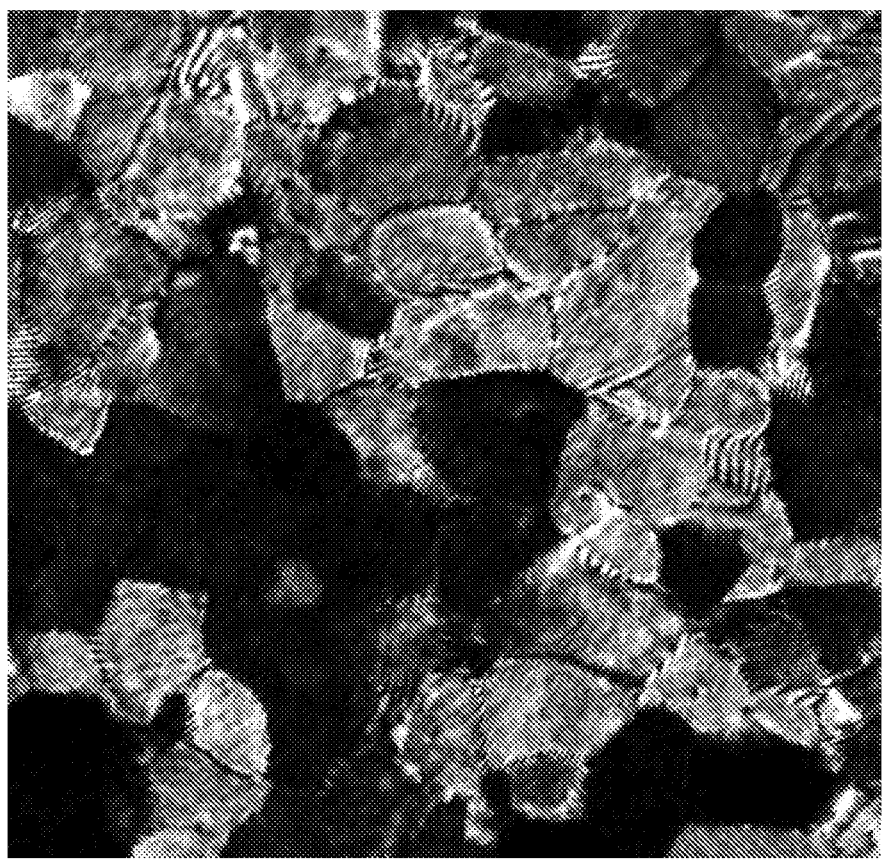
FIG. 9 shows a texture of a composite of a polymer and a liquid crystal.
Figure 10:
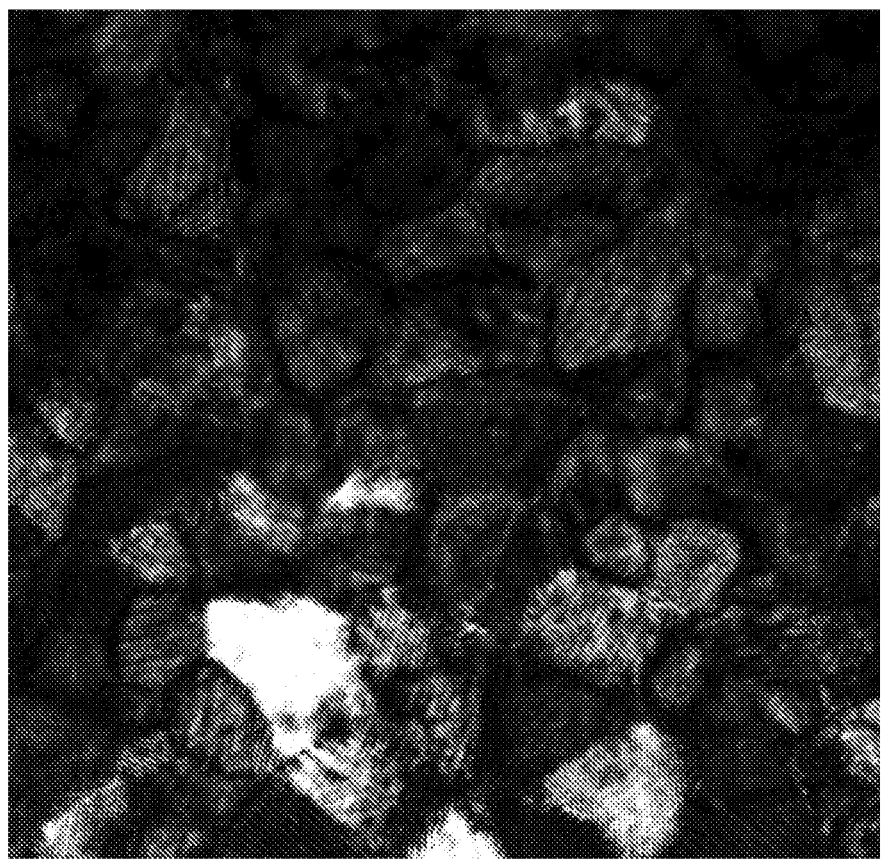
FIG. 10 shows a texture of a composite of a polymer and a liquid crystal.

By the above-described polymer stabilization treatment, a composite of a polymer and a liquid crystal was obtained. FIGS. 9 and 10 show textures of the composite of the polymer and the liquid crystal observed with a confocal laser microscope (A1 produced by Nikon Instech Co., Ltd.). Specifically, FIG. 9 shows an observation image of the composite of the polymer and the liquid crystal in a region in the vicinity of the glass substrate on the observation side, and FIG. 10 shows an observation image of the composite of the polymer and the liquid crystal in a bulk region (a middle region between the substrates). Note that the observations were performed using a laser with a wavelength of 488 nm under the following conditions: the measurement mode was a reflective mode; the magnification was 600 times; and the temperature was room temperature.

FIGS. 9 and 10 show that the composite of the polymer and the liquid crystal according to this comparative example has textures with similar aspects in the region (the surface region) in the vicinity of the glass substrate and in the bulk region (the inner region).

Specifically, it is found from FIG. 9 that a large number of single domains (regions which are separate from the other regions because their interfaces between a blue phase and a blue phase form loops) exist in the region (the surface region) in the vicinity of the glass substrate of the composite of the polymer and the liquid crystal according to this comparative example. In other words, it is found that many interfaces existing in the region form loops.

In addition, it is found from FIG. 10 that many interfaces existing in the bulk region (the inner region) of the composite of the polymer and the liquid crystal according to this comparative example also form loops.

Example 3

Figure 11:
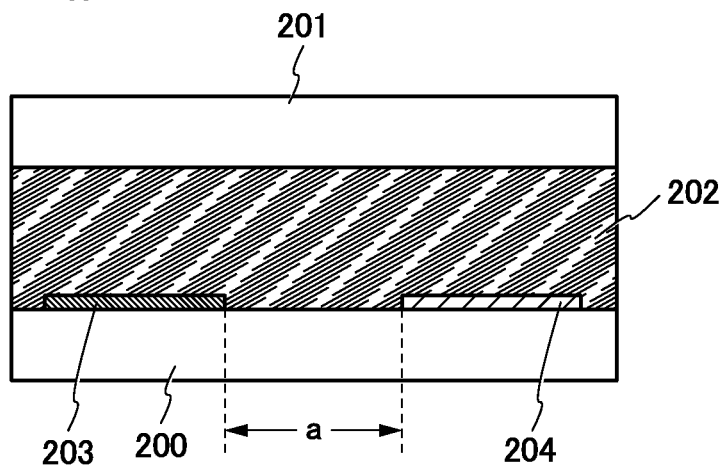
FIG. 11 illustrates an example of a liquid crystal element.

In this example, an example of a liquid crystal element formed using the composite of the polymer and the liquid crystal disclosed in this specification will be described with reference to FIG. 11. FIG. 11 is a cross-sectional view of the liquid crystal element.

In FIG. 11, a liquid crystal layer 202 is provided between a first substrate 200 and a second substrate 201. The composite of the polymer and the liquid crystal which is described in Example 1 is used for the liquid crystal layer 202. A pixel electrode layer 203 and a common electrode layer 204 are adjacently provided over the first substrate 200.

A method in which grayscale is controlled by generating an electric field which is substantially parallel to a substrate (i.e., in a horizontal direction) to move liquid crystal molecules substantially parallel to the substrate (i.e., in a horizontal direction) is applied to the liquid crystal element of this example.

Note that a distance a (shown in FIG. 11) between the pixel electrode layer 203 and the common electrode layer 204, which are adjacently provided with the liquid crystal layer 202 interposed therebetween, is a distance at which liquid crystal that is included in the liquid crystal layer 202 and exists between the pixel electrode layer 203 and the common electrode layer 204 responds when predetermined voltages are applied to the pixel electrode layer 203 and the common electrode layer 204. The applied voltage is controlled as appropriate in accordance with the distance a.

As the first substrate 200 and the second substrate 201, a glass substrate made of barium borosilicate glass, aluminoborosilicate glass, or the like, a quartz substrate, a plastic substrate, or the like can be used.

The pixel electrode layer 203 and the common electrode layer 204 can be formed using one or more of the following: indium tin oxide (ITO), a conductive material (indium zinc oxide) in which zinc oxide (ZnO) is mixed into indium oxide, a conductive material in which silicon oxide ($SiO_2$) is mixed into indium oxide, organoindium, organotin, indium oxide containing tungsten oxide, indium zinc oxide containing tungsten oxide, indium oxide containing titanium oxide, and indium tin oxide containing titanium oxide; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and nitrides thereof.

The liquid crystal layer 202 can be obtained as follows: the liquid crystal composition disclosed in this specification is provided between the first substrate 200 and the second substrate 201 by a dropping method (ODF), a liquid crystal injection method, or the like, and then is subjected to polymer stabilization treatment. Note that the thickness (film thickness) of the liquid crystal layer 202 is preferably greater than or equal to 1 μm and less than or equal to 20 μm.

In the thus formed liquid crystal element, since an electric field in a horizontal direction is generated between the pixel electrode layer 203 and the common electrode layer 204, the liquid crystal molecules in the liquid crystal layer 202 can be controlled in a direction parallel to the first substrate 201.

For the liquid crystal element of this example, optical films such as a polarizing plate, a retardation plate, and an anti-reflection film can be used in combination, as appropriate. For example, circular polarization by the polarizing plate and the retardation plate may be used. In addition, a backlight or the like may be used as a light source.

Note that the liquid crystal element of this example can be applied to a transmissive liquid crystal display device in which display is performed by transmission of light from a light source, a reflective liquid crystal display device in which display is performed by reflection of incident light, or a semi-transmissive liquid crystal display device in which a transmissive type and a reflective type are combined.

Example 4

In this example, a liquid crystal display device in which the liquid crystal composition disclosed in this specification is used for a liquid crystal layer is described. Note that the liquid crystal display device of this example includes the liquid crystal element (also referred to as a liquid crystal display element) described in Example 3 as a display element. The liquid crystal display device may be a passive-matrix liquid crystal display device or an active-matrix liquid crystal display device, and in this example, the case of an active-matrix liquid crystal display device is described with reference to FIGS. 12A and 12B.

Figure 12A:
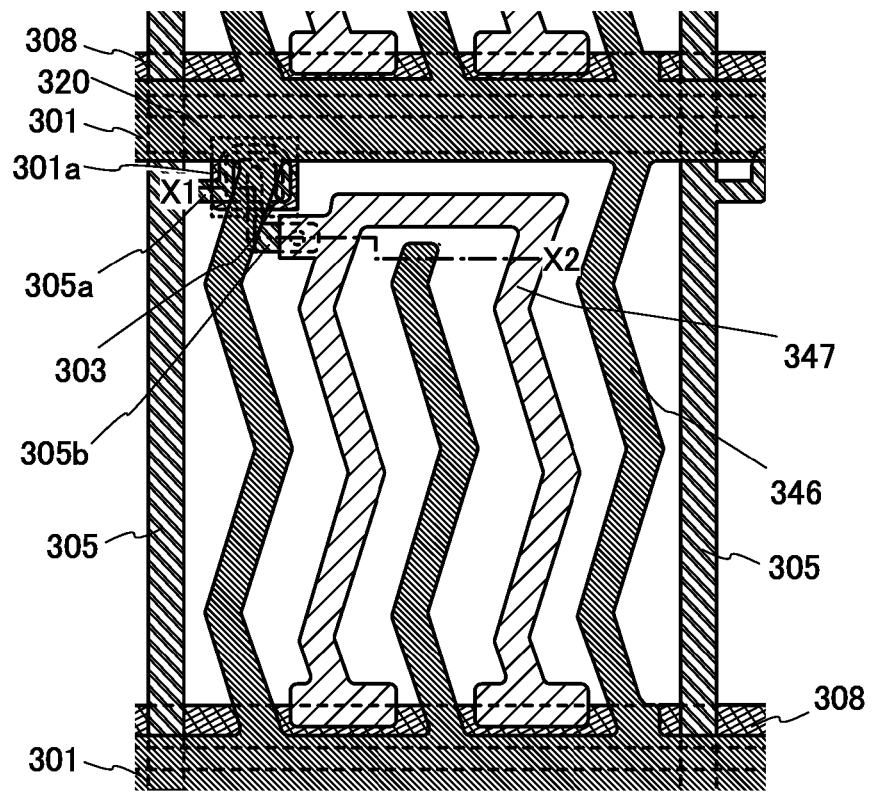
FIGS. 12A and 12B are a plan view and a cross-sectional view, respectively, illustrating an example of a liquid crystal display device.
Figure 12B:
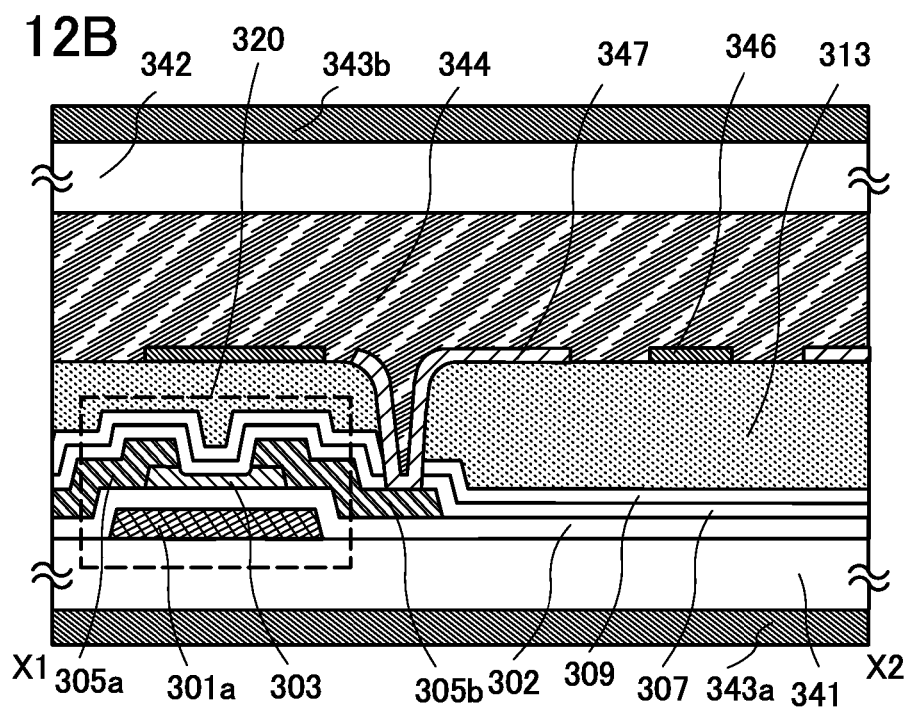

FIG. 12A is a plan view of a liquid crystal display device and illustrates one pixel thereof. FIG. 12B is a cross-sectional view taken along broken line X1-X2 in FIG. 12A.

In FIG. 12A, a plurality of source wiring layers 305 (including a wiring layer 305a) is arranged so as to be parallel to each other (extend in the longitudinal direction in FIG. 12A) and apart from each other. A plurality of gate wiring layers 301 (including a gate electrode layer 301a) is arranged so as to extend in a direction perpendicular to or substantially perpendicular to the source wiring layers 305 (the lateral direction in FIG. 12A) and apart from each other. A plurality of common wiring layers 308 is provided so as to be adjacent to the corresponding gate wiring layers 301 and extend in a direction parallel to or substantially parallel to the gate wiring layers 301, that is, in a direction perpendicular to or substantially perpendicular to the source wiring layers 305 (the lateral direction in FIG. 12A). A pixel electrode layer 347 and a common electrode layer 346 of the liquid crystal display device are arranged in a space surrounded by the source wiring layers 305, the common wiring layers 308, and the gate wiring layers 301. Note that the pixel electrode layer 347 is electrically connected to a transistor 320, and the transistor 320 is provided in each pixel.

In the liquid crystal display device of FIG. 12A, a capacitor is formed by the pixel electrode layer 347 and the common wiring layer 308. Although the common wiring layer 308 can operate in a floating state (an electrically isolated state), the potential thereof may be set to a fixed potential, preferably to a potential around a common potential (an intermediate potential of an image signal which is transmitted as data) at such a level as not to generate flickers.

In the electrode structure in the liquid crystal display device of FIGS. 12A and 12B, the pixel electrode layer 347 and the common electrode layer 346 are formed in one plane that is parallel to the substrate. A method in which grayscale is controlled by generating an electric field in the direction parallel to a substrate to move liquid crystal molecules in a plane parallel to the substrate (i.e., an IPS mode) can be applied.

Next, a cross-sectional structure of the liquid crystal display device shown in FIG. 12B is described. The liquid crystal display device shown in FIG. 12B has a structure in which a liquid crystal layer 344 is provided between a second substrate 342 and a first substrate 341 having the transistor 320, the pixel electrode layer 347, the common electrode layer 346, and the like. Further, polarizing plates 343a and 343b are provided in contact with the first substrate 341 and the second substrate 342, respectively.

Note that the transistor 320 is an inverted staggered thin film transistor in which the gate electrode layer 301a, a gate insulating layer 302, a semiconductor layer 303, and wiring layers 305a and 305b which function as a source electrode layer and a drain electrode layer are formed over the first substrate 341 having an insulating surface.

There is no particular limitation on the structure of the transistor that can be applied to a liquid crystal display device of this example; for example, a staggered type transistor or a planar type transistor having a top-gate structure or a bottom-gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual gate structure including two gate electrode layers positioned over and under a channel region with gate insulating layers provided therebetween.

In FIG. 12B, the gate electrode layer 301a is formed over the first substrate 341. The gate electrode layer 301a can be formed to have a single-layer or stacked structure using a metal material such as molybdenum, titanium, chromium, tantalum, tungsten, aluminum, copper, neodymium, or scandium, or an alloy material including any of these materials as a main component. By using a light-blocking conductive film as the gate electrode layer 301a, light from a backlight (light entering through the first substrate 341) can be prevented from being incident on the semiconductor layer 303.

The gate electrode layer 301a may have a stacked structure. For example, in the case where the gate electrode layer 301a has a two-layer structure, a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, or a two-layer structure in which a titanium nitride layer and a molybdenum layer are stacked is preferable. In the case where the gate electrode layer 301a has a three-layer structure, a stacked structure of a tungsten layer or a tungsten nitride layer, a layer of an alloy of aluminum and silicon or a layer of an alloy of aluminum and titanium, and a titanium nitride layer or a titanium layer is preferable.

Note that a base film formed of an insulating film may be provided between the first substrate 341 and the gate electrode layer 301a. The base film has a function of preventing diffusion of an impurity element from the first substrate 341, and can be formed to have a single-layer structure or a stacked structure using one or more of a silicon nitride film, a silicon oxide film, a silicon nitride oxide film, and a silicon oxynitride film.

The gate insulating layer 302 can be formed to have a single-layer structure or a stacked structure using a silicon oxide layer, a silicon nitride layer, a silicon oxynitride layer, or a silicon nitride oxide layer by a plasma CVD method, a sputtering method, or the like. Alternatively, a silicon oxide layer formed by a CVD method using an organosilane gas can be used as the gate insulating layer 302. As the organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), or trisdimethylaminosilane ($SiH(N(CH_3)_2)_3$) can be used.

A material used for the semiconductor layer 303 is not limited to a particular material and may be determined as appropriate in accordance with characteristics needed for the transistor 320. The semiconductor layer 303 can be formed using the following material: an amorphous semiconductor manufactured by a sputtering method or a vapor-phase growth method using a semiconductor source gas typified by silane or germane; a polycrystalline semiconductor formed by crystallizing the amorphous semiconductor with use of light energy or thermal energy; a microcrystalline semiconductor; an oxide semiconductor; or the like.

A typical example of an amorphous semiconductor is hydrogenated amorphous silicon, while a typical example of a crystalline semiconductor is polysilicon and the like. Polysilicon (polycrystalline silicon) includes high-temperature polysilicon which contains polysilicon formed at a process temperature of 800° C. or higher as its main component, low-temperature polysilicon which contains polysilicon formed at a process temperature of 600° C. or lower as its main component, and polysilicon formed by crystallizing amorphous silicon by using an element or the like which promotes crystallization. Needless to say, as described above, a microcrystalline semiconductor or a semiconductor which includes a crystal phase in part of a semiconductor layer can also be used.

As the oxide semiconductor, a four-component metal oxide such as an In—Sn—Ga—Zn—O-based oxide semiconductor, a three-component metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor, a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, or an In—Ga—O-based oxide semiconductor, an In—O-based oxide semiconductor, a Sn—O-based oxide semiconductor, a Zn—O-based oxide semiconductor, or the like can be used. Further, $SiO_2$ may be contained in the above oxide semiconductor. Here, for example, the In—Ga—Zn—O-based oxide semiconductor means an oxide containing at least In, Ga, and Zn, and the composition thereof is not particularly limited. The In—Ga—Zn—O-based oxide semiconductor may contain an element other than In, Ga, and Zn.

As the oxide semiconductor, a thin film represented by the chemical formula, $InMO_3(ZnO)_m$ (m>0), can be used. Here, M represents one or more metal elements selected from Ga, Al, Mn, and Co. For example, M may be Ga, Ga and Al, Ga and Mn, Ga and Co, or the like. As the oxide semiconductor, an oxide including a crystalline oxide semiconductor with c-axis alignment (also referred to as a c-axis aligned crystalline oxide semiconductor (CAAC-OS)), which has neither a single crystal structure nor an amorphous structure, can be used.

Note that the semiconductor layer 303 can be formed by a sputtering method, an LPCVD method, a plasma CVD method, or the like. In an etching step for processing the semiconductor layer 303 into a desired shape, dry etching or wet etching can be used.

Note that as an etching apparatus used for the dry etching, an etching apparatus using a reactive ion etching method (an RIE method), or a dry etching apparatus using a high-density plasma source such as ECR (electron cyclotron resonance) or ICP (inductively coupled plasma) can be used. As a dry etching apparatus by which uniform electric discharge can be obtained over a wider area as compared to an ICP etching apparatus, there is an ECCP (enhanced capacitively coupled plasma) mode etching apparatus in which an upper electrode is grounded, a high-frequency power source at 13.56 MHz is connected to a lower electrode, and further a low-frequency power source at 3.2 MHz is connected to the lower electrode. This ECCP mode etching apparatus can be applied, for example, even when a substrate of the tenth generation with a side of larger than 3 m is used.

As a material for the wiring layers 305a and 305b which serve as the source and drain electrode layers of the transistor 320, there is an element selected from aluminum (Al), chromium (Cr), tantalum (Ta), titanium (Ti), molybdenum (Mo), tungsten (W), copper (Cu), and magnesium (Mg), an alloy containing any of these elements as a component, an alloy in which any of these elements are combined, or the like. Further, in the case where heat treatment is performed, the conductive film preferably has heat resistance sufficient to withstand the heat treatment. For example, since the use of aluminum (Al) alone brings disadvantages such as low heat resistance and a tendency to corrosion, aluminum is used in combination with a conductive material having heat resistance. As the conductive material having heat resistance which is combined with aluminum, it is possible to use an element selected from titanium (Ti), tantalum (Ta), tungsten (W), molybdenum (Mo), chromium (Cr), neodymium (Nd), and scandium (Sc), an alloy containing any of these elements as its component, an alloy containing a combination of any of these elements, or a nitride containing any of these elements as its component.

Note that the gate insulating layer 302, the semiconductor layer 303, and the wiring layers 305a and 305b may be successively formed without exposure to air. Such successive formation without exposure to air allows a formation of each interface of the stacked layers without contamination by atmospheric components or impurity elements floating in air, so that variation in characteristics of the transistor can be reduced.

An inorganic insulating film or an organic insulating film formed by a dry method or a wet method can be used for an insulating film 307 and an insulating film 309. For example, it is possible to use a silicon nitride film, a silicon oxide film, a silicon oxynitride film, an aluminum oxide film, a tantalum oxide film, or the like, which is formed by a CVD method, a sputtering method, or the like. Alternatively, an organic material such as polyimide, acrylic, benzocyclobutene, polyamide, or an epoxy resin can be used. Other than such organic materials, a low dielectric constant material (a low-k material), a siloxane-based resin, phosphosilicate glass (PSG), borophosphosilicate glass (BPSG), or the like can be used. A gallium oxide film can also be used as the insulating film 307.

Note that the siloxane-based resin corresponds to a resin including a Si—O—Si bond formed using a siloxane-based material as a starting material. A siloxane-based resin may include, as a substituent, an organic group (e.g., an alkyl group or an aryl group) or a fluoro group. A siloxane-based resin is applied by a coating method and baked; thus, the insulating film 307 or the insulating film 309 can be formed.

Note that the insulating film 307 and the insulating film 309 may be formed to have a stacked structure including a plurality of insulating films formed using the above-described materials. For example, a structure where an organic resin film is stacked over an inorganic insulating film may be employed.

An interlayer film 313 can be formed using the same material as the material used for the insulating film 307 and the insulating film 309. There is no particular limitation on the method for forming the interlayer film 313, and the following method or tool (equipment) can be used depending on the material: spin coating, dipping, spray coating, a droplet discharge method (such as an inkjet method), a printing method (such as screen printing or offset printing), a roll coater, a curtain coater, a knife coater, or the like.

The pixel electrode layer 347 and the common wiring layer 308 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added. Alternatively, the pixel electrode layer 347 and the common wiring layer 308 can be formed using one or more kinds of materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag), alloys containing any of these metals, and nitrides of these metals.

Alternatively, the pixel electrode layer 347 and the common wiring layer 308 can be formed using a conductive composition including a conductive high molecular compound (also referred to as a conductive polymer). The pixel electrode formed using the conductive composition preferably has a sheet resistance of less than or equal to 10000 ohms per square and a transmittance of greater than or equal to 70% at a wavelength of 550 nm. Further, the resistivity of the conductive high molecular compound included in the conductive composition is preferably less than or equal to 0.1 Ω·cm. Note that as the conductive high molecular compound, a so-called π electron conjugated conductive high molecular compound can be used. For example, polyaniline or a derivative thereof, polypyrrole or a derivative thereof, polythiophene or a derivative thereof, a copolymer of two or more of aniline, pyrrole, and thiophene or a derivative thereof can be given.

For the liquid crystal layer 344, the liquid crystal composition that is one embodiment of the present invention is used. Note that the liquid crystal composition includes the liquid crystal material exhibiting a blue phase, the liquid-crystalline monomer, the non-liquid-crystalline monomer, and the polymerization initiator. A composite of a polymer and a liquid crystal which is obtained by polymer stabilization treatment (polymerization treatment) of the liquid crystal composition is used for the liquid crystal layer 344.

Note that although not shown here, the liquid crystal composition for forming the liquid crystal layer 344 is provided between the first substrate 341 and the second substrate 342 that is a counter substrate, and then the first and second substrates are bonded with a sealant. The liquid crystal composition can be provided between the first and second substrates by a dropping method (ODF), or a liquid crystal injection method in which the first substrate 341 is bonded to the second substrate 342 and then liquid crystal is injected using a capillary phenomenon or the like.

As the sealant, it is typically preferable to use a visible light curable resin, an ultraviolet curable resin, or a heat curable resin. Typically, an acrylic resin, an epoxy resin, an amine resin, or the like can be used. Further, a photopolymerization initiator (typically, an ultraviolet light polymerization initiator), a heat curing agent, a filler, or a coupling agent may be included in the sealant.

After the space between the first substrate 341 and the second substrate 342 is filled with the liquid crystal composition, polymer stabilization treatment (polymerization treatment) is performed by light irradiation, whereby the liquid crystal layer 344 is formed. The light has a wavelength with which the liquid-crystalline monomer, the non-liquid-crystalline monomer, and the polymerization initiator included in the liquid crystal composition react. Through the polymer stabilization treatment (polymerization treatment) by the light irradiation, the liquid crystal layer 344 is obtained. Note that in the case of using a photocurable resin as a sealant, curing of the sealant may be performed concurrently with the polymer stabilization treatment.

Note that owing to the electrode structure of the liquid crystal display device of this example, liquid crystal molecules included in the liquid crystal layer 344 are controlled by an electric field in the horizontal direction. The composite of the polymer and the liquid crystal is aligned so as to exhibit a blue phase and can be controlled in the direction parallel to the substrate; thus, a wide viewing angle can be obtained.

In this example, the polarizing plate 343a is provided on the outer side (on the side opposite to the liquid crystal layer 344) of the first substrate 341, and the polarizing plate 343b is provided on the outer side (on the side opposite to the liquid crystal layer 344) of the second substrate 342. In addition to the polarizing plates, an optical film such as a retardation plate or an anti-reflection film may be provided. For example, circular polarization by the polarizing plate and the retardation plate may be used.

Although not shown, a backlight, a sidelight, or the like can be used as a light source of the liquid crystal display device of this example. Light from the light source is emitted from the first substrate 341 side so as to pass through the second substrate 342 on the viewing side.

In the case of manufacturing a plurality of liquid crystal display devices using a large-sized substrate (a so-called multiple panel method), a division step can be performed before the polymer stabilization treatment or before the polarizing plates are provided. In consideration of the influence of the division step on the liquid crystal layer (such as disorder of orientation due to force applied in the division step), it is preferable that the division step be performed after the attachment of the first substrate 341 and the second substrate 342 before the polymer stabilization treatment.

The use of the liquid crystal composition which is one embodiment of the present invention in the liquid crystal display device of this example can reduce the occurrence of defective orientation in the composite of the polymer and the liquid crystal exhibiting a blue phase. As a result, defects of a panel of the liquid crystal display device can be reduced, so that the yield of the liquid crystal display device can be improved.

In the liquid crystal display device of this example, the composite of the polymer and the liquid crystal can exhibit a blue phase and provide high contrast; thus, a liquid crystal display device with high visibility and high image quality can be provided. Further, since a blue phase liquid crystal element is capable of high-speed response, a liquid crystal display device with higher performance can be achieved.

Example 5

In this example, the following liquid crystal panels were fabricated: a liquid crystal panel (also referred to as a first liquid crystal panel) including a composite of a polymer and a liquid crystal which is obtained by polymer stabilization treatment of the liquid crystal composition described in Example 1 at a temperature where the liquid crystal material contained in the liquid crystal composition exhibits an isotropic phase; a liquid crystal panel (also referred to as a second liquid crystal panel) including a composite of a polymer and a liquid crystal which is obtained by polymer stabilization treatment of the liquid crystal composition at a temperature where the liquid crystal material contained in the liquid crystal composition exhibits a blue phase; and a liquid crystal panel (also referred to as a third liquid crystal panel) including a composite of a polymer and a liquid crystal which is obtained by polymer stabilization treatment of the liquid crystal composition described above in Comparative Example 1 at a temperature where the liquid crystal material contained in the liquid crystal composition exhibits a blue phase.

First, a method for fabricating the first liquid crystal panel will be described.

A resin gap spacer with a height of 4 μm and a light- and heat-curable sealant (SD-25, produced by Sekisui Chemical Co., Ltd.) were formed over a 5-inch-diagonal glass substrate used as a first substrate. In addition, circuits such as a transistor, including an electrode layer for driving a liquid crystal layer, were formed over a 5-inch-diagonal glass substrate used as a second substrate.

Next, the liquid crystal composition described above in Example 1 was dropped into the inside of the sealant over the first substrate. At that time, the temperature of the liquid crystal composition was set to 70° C., and about 14 mg of the liquid crystal composition was dropped into the inside of the sealant.

Next, the first substrate and the second substrate were attached to each other. Here, the second substrate was fixed with an electrostatic chuck in an upper position in a chamber so that the side on which the circuits such as a transistor including an electrode layer were provided faced downward, and the first substrate was placed in a lower position in the chamber so that the side on which the liquid crystal composition was provided faced upward. Then, the pressure inside the chamber was reduced to 100 Pa, and the first substrate and the second substrate were attached to each other. After that, the chamber was opened to the air.

Next, the sealant provided around the pair of substrates where the liquid crystal composition was enclosed was pre-cured (temporarily cured) by irradiation with ultraviolet light (irradiance: 11 mW/cm$^2$). Note that the irradiation was conducted in a state where the liquid crystal composition was masked so as not to be irradiated with ultraviolet light.

Then, a substrate obtained by attaching the first substrate and the second substrate to each other was placed over a stage including a heat source, and the liquid crystal composition was heated to 70° C.

Then, the liquid crystal composition was rapidly cooled to 38° C. at −5° C./min, and with the temperature held at 38° C., polymer stabilization treatment was performed by irradiation with ultraviolet light (11 mW/cm$^2$) with a main wavelength of 365 nm for 6 minutes through a sharp cut filter which cuts out light with wavelengths of 350 nm or less. Note that at 38° C., the liquid crystal material contained in the liquid crystal composition exhibits an isotropic phase. By the polymer stabilization treatment, a composite of a polymer and a liquid crystal exhibiting a polymer stabilized blue phase was obtained.

Figure 13A:
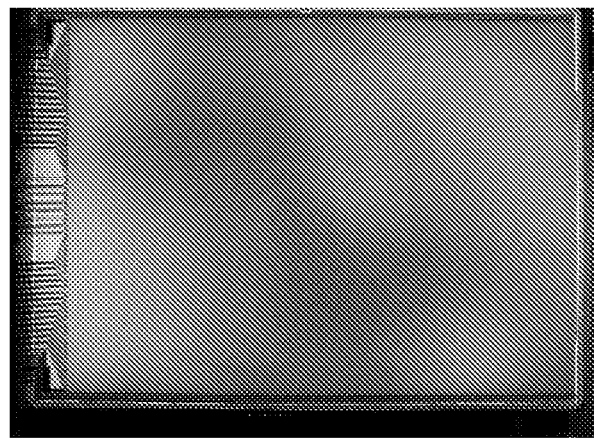
FIGS. 13A to 13C show photographs of the external appearance of liquid crystal panels.

In that state, heat treatment was performed at 120° C. for 1 hour to fully (permanently) cure the sealant. In the above manner, the first liquid crystal panel was obtained. FIG. 13A shows a photograph of the external appearance of the first liquid crystal panel.

Next, a method for fabricating the second liquid crystal panel will be described.

In a manner similar to that described above, a substrate including the liquid crystal composition described in Example 1 in a space surrounded by the first substrate, the second substrate, and the sealant (pre-cured) (a substrate obtained by attaching the first substrate and the second substrate to each other) was placed over a stage including a heat source, and the liquid crystal composition was heated to 70° C. After that, the temperature was lowered from 70° C. at −1° C./min and held at 34° C., and polymer stabilization treatment was performed by irradiation with ultraviolet light (8 mW/cm$^2$) with a main wavelength of 365 nm for 6 minutes through a sharp cut filter which cuts out light with wavelengths of 350 nm or less. Note that at 34° C., the liquid crystal material contained in the liquid crystal composition exhibits a blue phase. By the polymer stabilization treatment, a composite of a polymer and a liquid crystal exhibiting a polymer stabilized blue phase was obtained.

Figure 13B:
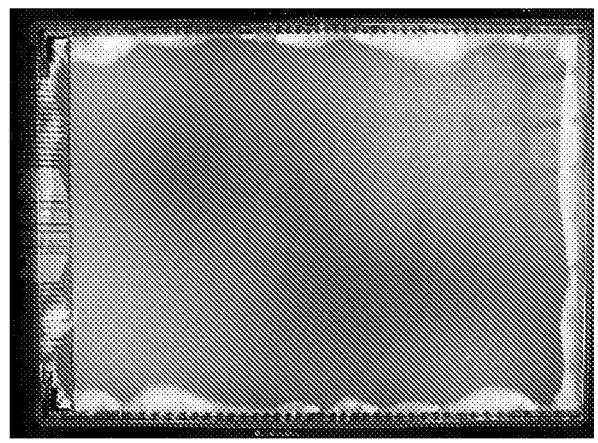

In that state, heat treatment was performed at 120° C. for 1 hour to fully (permanently) cure the sealant. In the above manner, the second liquid crystal panel was obtained. FIG. 13B shows a photograph of the external appearance of the second liquid crystal panel.

Next, a method for fabricating the third liquid crystal panel will be described.

In a manner similar to that described above, a substrate including the liquid crystal composition described in Comparative Example 1 in a space surrounded by the first substrate, the second substrate, and the sealant (pre-cured) (a substrate obtained by attaching the first substrate and the second substrate to each other) was placed over a stage including a heat source, and the liquid crystal composition was heated to 70° C. After that, the temperature was lowered from 70° C. at −1° C./min and held at 34° C., and polymer stabilization treatment was performed by irradiation with ultraviolet light (8 mW/cm$^2$) with a main wavelength of 365 nm for 6 minutes through a sharp cut filter which cuts out light with wavelengths of 350 nm or less. Note that at 34° C., the liquid crystal material contained in the liquid crystal composition exhibits a blue phase.

Figure 13C:
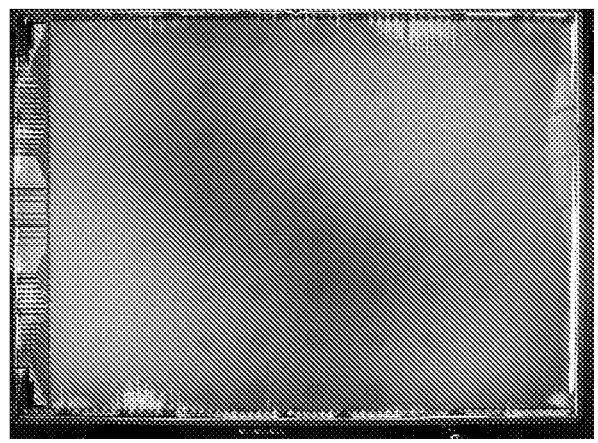

In that state, heat treatment was performed at 120° C. for 1 hour to fully (permanently) cure the sealant. In the above manner, the third liquid crystal panel was obtained. FIG. 13C shows a photograph of the external appearance of the third liquid crystal panel.

The first to third liquid crystal panels (FIGS. 13A to 13C) are compared. In the third liquid crystal panel (FIG. 13C), light leakage due to phase transition to a cholesteric phase (defective orientation) occurred in the entire display region. On the other hand, in the second liquid crystal panel (FIG. 13B), defective orientation was slightly observed in the peripheral region, whereas hardly any defective orientation occurred in the central region. In the first liquid crystal panel (FIG. 13A), hardly any defective orientation occurred.

Therefore, it is possible to reduce the occurrence of defective orientation in a liquid crystal panel including a composite of a polymer and a liquid crystal according to one embodiment of the present invention. Accordingly, it is possible to reduce the occurrence of defective display by a liquid crystal panel including a composite of a polymer and a liquid crystal according to one embodiment of the present invention.

This application is based on Japanese Patent Application serial no. 2011-240546 filed with Japan Patent Office on Nov. 1, 2011 and Japanese Patent Application serial no. 2011-262669 filed with Japan Patent Office on Nov. 30, 2011, the entire contents of which are hereby incorporated by reference.

What is claimed is:

1. A composite of polymer and liquid crystal comprising:
a liquid crystal material; and
a polymer,
wherein the composite of polymer and liquid crystal is obtained by polymerization using a monomer,
wherein the monomer comprises mesogenic skeleton and two alkyl chains,
wherein an aspect of a texture in a surface region of the composite of polymer and liquid crystal is different from an aspect of a texture in an inner region of the composite of polymer and liquid crystal,
wherein the composite of polymer and liquid crystal has a first transmission spectrum with a single peak in a temperature range where the liquid crystal material exhibits a blue phase, and
wherein the first transmission spectrum is obtained by removing a second transmission spectrum obtained in a temperature range where the liquid crystal material contained in the composite of polymer and liquid crystal exhibits an isotropic phase.

2. The composite of polymer and liquid crystal according to claim 1, wherein the single peak is out of a visible region.

3. A composite of polymer and liquid crystal comprising:
a liquid crystal material; and
a polymer,
wherein the composite of polymer and liquid crystal is obtained by polymerization using a monomer,
wherein the monomer comprises mesogenic skeleton and two alkyl chains, and
wherein an aspect of a texture in a surface region of the composite of polymer and liquid crystal is different from an aspect of a texture in an inner region of the composite of polymer and liquid crystal.

4. The composite of polymer and liquid crystal according to claim 3, comprising:
at least one first interface between a blue phase and a blue phase in the texture in the surface region; and
at least one second interface between a blue phase and a blue phase in the texture in the surface region,
wherein the first interface is defined by a line which forms a loop,
wherein the second interface is defined by a line which has a starting point and an ending point, and
wherein a total length of the line which forms a loop is shorter than a total length of the line which has a starting point and an ending point.

5. The composite of polymer and liquid crystal according to claim 3, comprising:
at least one second interface between a blue phase and a blue phase in the texture in the surface region,
wherein the second interface is defined by a line which has a starting point and an ending point,
wherein a first interface is defined by a line which forms a loop,
wherein the composite of polymer and liquid crystal does not comprise the first interface in the texture in the surface region.

6. The composite of polymer and liquid crystal according to claim 4, wherein the composite of polymer and liquid crystal does not comprise the first interface in a texture in an inner region.

7. The composite of polymer and liquid crystal according to claim 5, wherein the composite of polymer and liquid crystal does not comprise the first interface in a texture in an inner region.

8. The composite of polymer and liquid crystal according to claim 6, wherein the composite of polymer and liquid crystal does not comprise the second interface in the texture in the inner region.

9. The composite of polymer and liquid crystal according to claim 7, wherein the composite of polymer and liquid crystal does not comprise the second interface in the texture in the inner region.

10. A liquid crystal display device comprising:
a pixel comprising:
a pair of electrodes; and
the composite of polymer and liquid crystal according to claim 1 between the pair of electrodes.

11. A liquid crystal display device comprising:
a pixel comprising:
a pair of electrodes; and
the composite of polymer and liquid crystal according to claim 3 between the pair of electrodes.

12. The composite of polymer and liquid crystal according to claim 1, wherein the two alkyl chains are the same.

13. The composite of polymer and liquid crystal according to claim 3, wherein the two alkyl chains are the same.

* * * * *